Sept. 17, 1940. K. H. WEBER 2,215,307
METHOD OF FORMING ARMATURE COILS
Filed Oct. 24, 1936
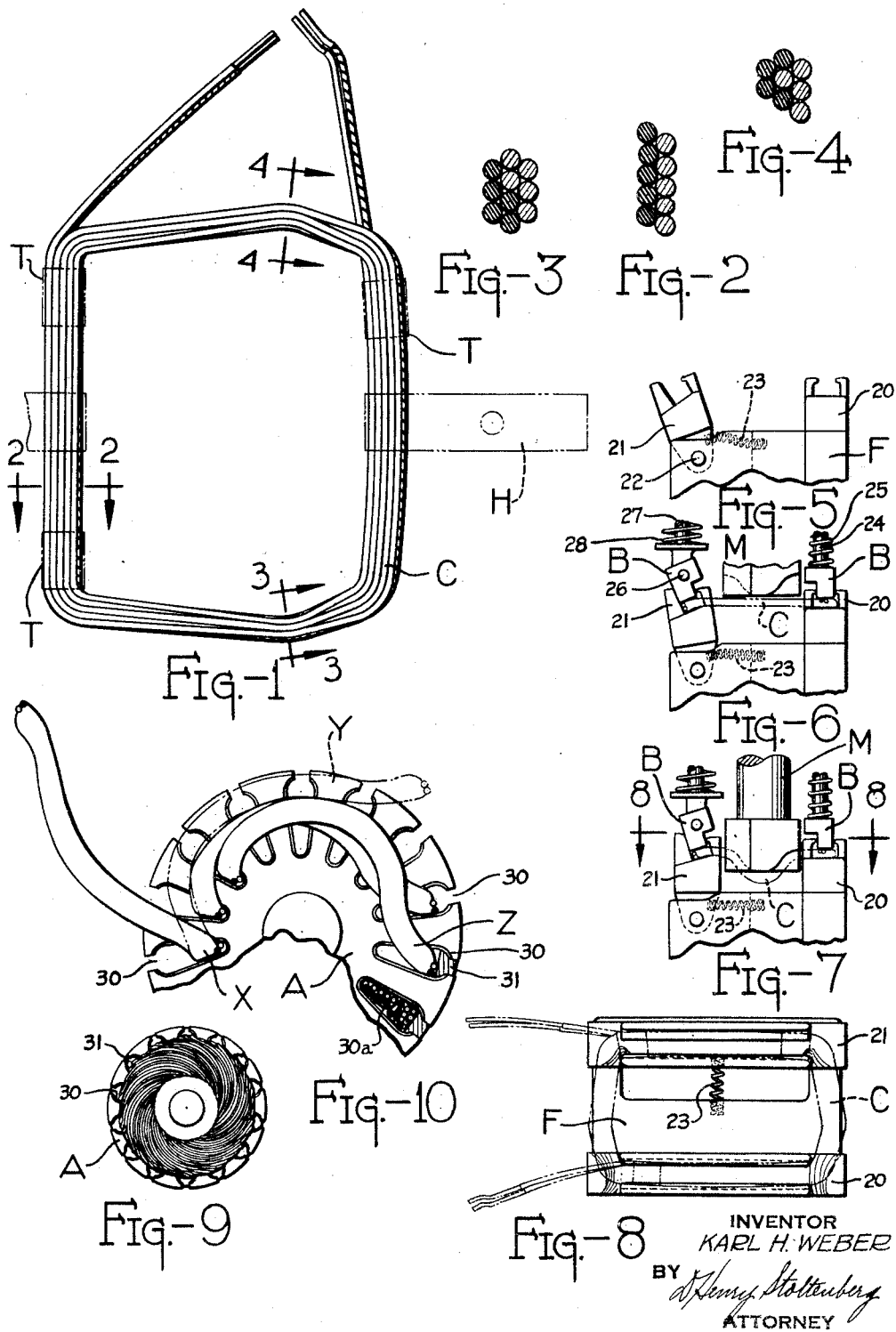
INVENTOR
KARL H. WEBER
BY
ATTORNEY Patented Sept. 17, 1940

2,215,307

UNITED STATES PATENT OFFICE 2,215,307

METHOD OF FORMING ARMATURE COILS

Karl H. Weber, Toledo, Ohio

Application October 24, 1936, Serial No. 107,341

2 Claims. (Cl. 171—206)

This invention relates to methods of winding slotted armatures in which separately-wound coils are pre-formed to a desirable contour and fitted into the slots of the armature.

In the past, armatures have been wound by positioning the wires forming the individual coils directly into the slots either manually or by automatic machines. Armatures wound in this manner have been unsatisfactory for rotation at high speeds because the weight was disposed unequally around the axis of rotation, causing undue vibration. Inasmuch as the separate coils wound in the slots of the armature by this method have varying amounts of wire in their make-up, due to the difference in overlap in the inactive coil ends, the electrical characteristics of the armature were also unbalanced. The varying amounts of wire in the individual coils gave rise to unequal voltage drops and heat losses caused by the unequal resistance in the various coils.

To overcome these disadvantages, form-wound armatures have been developed in which individual coils fitted into the slots of the armature may be pre-wound upon automatic machines to a proper contour such as, for example, the machine disclosed in a co-pending application Serial Number 107,340, filed October 24, 1936. By the use of this automatic machine, the coils may be wound individually and shaped in a separate forming operation which contours the inactive coil ends into a shape proper to nestle the coils together on the ends of the armature, and then fitted into the insulated slots of the armature. The coils, as wound by the automatic machine, are substantially uniform both in their electrical and mechanical characteristics so that when the coil, after being properly contoured, is fitted into the slots, the armature resulting is substantially balanced to overcome the disadvantages pointed out above.

When the coils are fitted in the armature slots, their inactive coil ends nestle together in such manner that the space at the armature ends is efficiently utilized, giving the armature a desirable compactness and allows the amount of material used in fabricating the complete generator to be reduced to a minimum inasmuch as the longitudinal dimension of the generator may be diminished.

Another advantage which is inherent in the use of the form-wound method of winding armatures arises from the greater uniformity that may be attained in the effectiveness of the insulation of the armature. This results in a minimum of break-downs of the armature insulation while the generator is in service and, at the same time, results in a minimum of rejected armatures during the manufacturing process for short circuits from defective insulation.

In the directly-wound armature, fabricated by machine, the wires of the various coils may come into contact with each other at the coil ends at an angle approaching 90 degrees, so that the bearing pressure between the wires is focused on the insulation at their crossing points. Furthermore, the wire is placed into the armature slots under considerable tension, so that it is bent at a sharp angle at the corners of the armature core. The shifting of the wire during the winding process or during the heating and cooling of coils in the service of the generator causes attrition between the wires or between the core and the wires, which wears away the insulation on the wires at the point of contact and, in many instances, results in a short-circuit at that point. After a short circuit develops, the armature is useless.

In the form-wound coil, of the type disclosed, the wires are kept in substantially parallel juxtaposition throughout the armature both with regard to the wires of the individual coils and between the wires of the separate coils where they come into intimate contact when in position on the armature. Inasmuch as forms are used in the winding, no tension is placed upon the wires in positioning them in the slot relieving the wires of the tension which is disadvantageous under the operating conditions of the generator. The sharp bends in the wire are also avoided at the inactive coil ends. The coils are formed at this point to nestle together to prevent any focus of contactual area, thereby distributing uniformly the attrition between the wires during the heating and cooling of the coil so that no short-circuit is likely due to break-down of the insulation. During the winding of the armature, no attrition between the coils is possible, which obviates the danger pointed out with regard to the machine-wound armature.

It is, therefore, a principal object of this invention to provide a pre-formed coil suitable to be positioned in the slots of an armature in which the wires are wound in substantially parallel juxtaposition on the coil ends, to cooperate with adjacent coil ends in adjacent armature slots to eliminate concentration of bearing areas between individual wires.

It is a further object of this invention to provide a method of winding an armature in which the coil is wound on a form with the wires in parallel juxtaposition and the coil ends then formed in a contour to nestle together with other coil ends to allow ready positioning of the coils in the armature slots.

Other objects and advantages of this invention relating to the arrangement, operation and function of the related elements of the structure, to various details of construction, to combinations of parts and to economies of manufacture, will be apparent to those skilled in the art upon consideration of the following description and appended claims, reference being had to the accompanying drawing forming a part of this specification wherein like reference characters designate corresponding parts in the several views.

Figure 1 is a plan view of the coil.

Figure 2 is a view taken along the line 2—2 of Figure 1.

Figure 3 is a view taken along the line 3—3 of Figure 1.

Figure 4 is a view taken along the line 4—4 of Figure 1.

Figure 5 is an elevation of the holding block in which the coil ends are formed.

Figure 6 is a view, similar to Figure 5, showing the coil in position in the holding block with the movable portion cooperating therewith just prior to the forming stroke.

Figure 7 is a view, similar to Figure 6, with the forming stroke completed.

Figure 8 is a view taken along the line 8—8 of Figure 7 with the movable portion removed.

Figure 9 is an end view of a complete armature with the coils in position.

Figure 10 is an end view of an armature coil showing the positioning of the coils.

Referring to the drawing, a coil as wound by the automatic machine (mentioned supra) is shown in Figure 1 in which a temprary holding means H, such as a clip or the like, is shown in phantom on each coil side; the holding means is removed upon the application of tape T, which holds the wires in form until the coil is positioned in the slots of an armature. The winding form in which the coil is wound is designed to give the coil substantially quadrilateral sides as shown in Figure 2 wherein the wires in the separate layers cooperate together to give the smallest possible transverse dimension in the quadrilateral. This is attained by winding the wires obliquely so that contact is made between the adjacent wires in a plane displaced from the normal plane of the coil side. The coil, as shown, is wound with two wires but may be modified to suit the conditions under which the coil is to be used.

In Figures 2, 3, and 4, the relative positions of the wires forming the coil at the various locations are shown by cross-sectional views in which the individual wires are distinguished by being in solid black or cross-hatched. As pointed out above, Figure 2 is a cross-sectional view of the coil side, which is substantially quadrilateral in shape. Figures 3 and 4 are cross-sectional views, taken on the coil ends, showing the modified grouping of the wires at that point. On the coil ends, the wires are made as short as possible so as to use the smallest amount of wire in the make-up of the coil. In order to attain this end, the wires are grouped into a form as nearly cylindrical as possible, which reduces their length to a minimum.

After the coil has been taped by the strips T to hold it in form, the coil is placed in a shaping device shown generally in Figures 5, 6, 7, and 8.

In the use of the shaper the coil ends are conformed by placing the first coil in position in the holding form F as shown in Figure 6 in which two channels 20 and 21 embrace the quadrilateral coil sides. The initial position of the holding form F is shown in Figure 5 in which the channel 20 is stationary, and the channel 21 is pivoted for movement about a pin 22. The channel 21 is pushed outwardly by means of a spring 23 so that the channels may be separated by distance equal to the distance between the sides of the coil. This allows the coil sides to be fitted directly into the channels as shown in Figure 6.

After the coil has been fitted into the channels 20 and 21, a movable portion M, comprising a form and holding members best illustrated in Figure 7, moves in cooperation with the holding form F to form the conformation of the coil ends. The movable portion is provided with holding members in the nature of clamping blocks B which cooperate with the channels 20 and 21. The clamping block B, which cooperates with the stationary channel 20, is fixedly mounted on a shaft 24, about which a spring 25 is mounted to allow the clamping block B to hold the coil resiliently in position in the channel 20. The clamping block B, which cooperates with the movable channel 21, is pivoted about a pin 26 which is positioned in the lower end of a shaft 27, the shaft 27 also being provided with a spring 28 in a manner similar to the clamping block cooperating with the channel 20. By this means, the clamping block may conform to the angular displacement of the channel 21 and, through the action of its spring 28, may hold the coil side firmly in position in the channel 21.

When the clamping blocks B are cooperating with the channels 20 and 21 in the manner shown in Figure 6, the form of the movable portion M continues its downward movement until it contacts the coil ends as shown in Figure 7. The clamping blocks B, in the meantime, have been holding the coil sides firmly in the channels. The lower face of the form is contoured to the desired shape so that the coil ends will be given a substantially semi-circular form. In forming the coil ends, the sides of the coil are moved relatively closer together which forces the channel 21 to move about its pivot 22 against the spring 23 and to assume the position shown in Figure 7 in which the coil sides are slightly displaced from their original plane to diverge from the center of the semi-circular coil ends. After the form has moved downwardly to its maximum position, the movable portion M of the device is moved upwardly, allowing the coil to be removed from its position in the channels 20 and 21. After the coil has been removed, the channel 21 moves to its initial position under the influence of the spring 23 ready to begin a new cycle of operation.

After the coil has been formed to the contour shown in phantom in Figure 7, and in solid in Figure 10, the one coil side is positioned in the bottom of a slot 30 of the armature A as shown at "X" in Figure 10. Each slot 30 of the armature A is provided with the coil side in a similar manner. The other coil side, beginning with any convenient coil, is then pulled into position into its appropriate slot above a lower coil side as shown in the slot 30A. In order to do this, the coil side is pulled in a circumferential direction of the armature as shown in phantom at Y and finally positioned into the slot as shown at Z in which the lower coil side has been omitted for clearness. After the coil sides in a slot are in position, shown in the slot 30A, a rope filler means 31 is placed in the open end of the slot and expanded so as to close the slot and hold the coil sides firmly in position. This is clearly shown in slot 30A, the upper coil side being squashed by the rope filler to expand and fill the slot.

After the coils are positioned both as to the upper and lower sides in their appropriate slots as described above, the armature appears as shown generally in Figure 9 in which the wires of the coils are nestled together in substantially parallel relation to avoid any crossing between the wires which concentrates the bearing areas. The contactual area of the individual wires, due to the substantially parallel relation, is made as large as possible, so that the pressure may be reduced to a minimum. This effectually prevents such concentration of the pressure that the rubbing, which arises from the expansion and contraction of the wires during the service of the generator, does not have an opportunity to destroy the insulation on the wires and cause a short circuit.

After the coils have been positioned on the armature as shown in Figure 9, it is advantageous to apply pressure longitudinally of the armature shaft to compress the wires forming the coil ends into as intimate relation as possible so that a compact mass of wires in the nature of a hemisphere may be formed at each end of the armature. This pressure is preferably applied by the cup-shaped members embracing the armature shaft. This is particularly advantageous on the armature ends at which the commutator is attached inasmuch as the angle of approach of the connecting coil wires to the commutator is materially lessened by the process of compacting the coil ends. However, it is also advantageous on the opposite end of the armature to prevent loose wires from catching air and creating a siren effect during rotation. The coils, however, are not compressed to such an extent that they closely adhere to the armature core on their lower sides inasmuch as it is desirable to have air passages at these points for the cooling of the coils.

It is to be understood that the above detailed description of the present invention is intended to disclose an embodiment thereof to those skilled in the art, but that the invention is not to be construed as limited in its application to the details of construction and arrangement of parts illustrated in the accompanying drawing, since the invention is capable of being practiced and carried out in various ways without departing from the spirit of the invention. The language used in the specification relating to the operation and function of the elements of the invention is employed for purposes of description and not of limitation, and it is not intended to limit the scope of the following claims beyond the requirements of the prior art.

I claim:

1. The method of forming an electric coil for winding a form-wound armature comprising forming multi-wire active coil sides of a pair of layers whose cross-section is substantially in the form of a quadrilateral, the minor dimension of which is less than twice the diameter of the wires, and forming symmetrical inactive coil ends with a multiplicity of layers of wire greater than a pair whose cross-section approaches a circle in form and is smoothly arched between the coil sides, so that the high point of the arch is displaced from the center line of the two coil sides and also arched laterally from the plane of the active coil sides.

2. The method of forming an electric coil for winding a form-wound armature comprising forming multi-wire active coil sides of a multiplicity of layers whose cross-section is substantially in the form of a quadrilateral, the transverse minor dimension of which is less than the sum of the diameters of adjacent wires in the same dimension, and forming inactive coil ends with a greater number of layers than the active coil sides, the cross-section of the ends approaching a circle in form and smoothly arching the inactive coil ends longitudinally of the active coil sides, so that the high point of the arch is displaced from their center line and also arching the inactive coil ends laterally from the plane of the active coil sides.

KARL H. WEBER.

CERTIFICATE OF CORRECTION.

Patent No. 2,215,307.　　　　　　　　　　　　　　　September 17, 1940.

KARL H. WEBER.

It is hereby certified that error appears in the printed specification of the above numbered patent requiring correction as follows: Page 2, first column, line 75, for the word "first" read --flat--; same page, second column, line 16, for "form" second occurrence, read --perform--; and that the said Letters Patent should be read with this correction therein that the same may conform to the record of the case in the Patent Office.

Signed and sealed this 1st day of April, A. D. 1941.

(Seal)　　　　　　　　　　　　　　　　　　　　　Henry Van Arsdale,
　　　　　　　　　　　　　　　　　　　　　　Acting Commissioner of Patents.